United States Patent [19]

Pettifer et al.

[11] Patent Number: 5,171,110
[45] Date of Patent: Dec. 15, 1992

[54] APPARATUS AND METHOD FOR COUNTERBORING A PIPE

[75] Inventors: Donald A. Pettifer, Rolleyview; William B. Pettifer, Edmonton, both of Canada

[73] Assignee: CRC-Evans Canada Ltd., Edmonton, Canada

[21] Appl. No.: 627,313

[22] Filed: Dec. 14, 1990

[51] Int. Cl.⁵ .......................................... B23B 35/00
[52] U.S. Cl. .................................. 408/1 R; 408/82; 82/1.11
[58] Field of Search ........... 82/113, 1.2, 1.4, 1.5, 82/131, 158, 161, 1.11; 408/82, 152, 180, 1 R; 144/205; 409/300, 143; 29/33 A, 33 T

[56] References Cited

U.S. PATENT DOCUMENTS

| | | | |
|---|---|---|---|
| 191,561 | 6/1877 | Blair | 408/152 |
| 2,215,344 | 9/1940 | Albrecht | 408/152 |
| 3,075,412 | 1/1963 | Kushmuk et al. | 82/1.2 |
| 3,330,078 | 7/1967 | Von Tersch | 82/1.1 X |
| 3,608,406 | 9/1971 | Paysinger et al. | 82/1.11 |
| 3,733,939 | 5/1973 | Paysinger et al. | 82/113 |
| 3,835,738 | 9/1974 | Kellum et al. | 82/1.2 X |
| 4,104,937 | 8/1978 | Breaux | 82/113 |
| 4,248,559 | 2/1981 | Deckenback et al. | 408/82 X |
| 4,375,773 | 3/1983 | Liermann | 82/1.2 |
| 4,387,612 | 6/1983 | Eckle et al. | 82/1.2 X |
| 4,634,323 | 1/1987 | Wagner et al. | 82/163 X |
| 4,758,121 | 7/1988 | Kwech | 82/131 X |
| 4,822,221 | 4/1989 | Illakowicz | 82/1.2 X |

Primary Examiner—Larry I. Schwartz
Assistant Examiner—Julie R. Daulton
Attorney, Agent, or Firm—Richards, Medlock & Andrews

[57] ABSTRACT

An apparatus (10,100) for counterboring a pipe is attached to a pipe end surfacing machine (12) and is comprised of a frame (14) pivotally mounted to a flywheel (16). A cutting tool (50) and guide wheel (72) are attached to said frame (14). Means (91) for positioning the frame so as to locate the guide wheel (72) and cutting tool (50) relative to the pipe for machining is connected between said flywheel and said frame. In operation, the apparatus (10,100) is inserted into said pipe and the cutting tool (50) is positioned to contact the inner surface of the pipe adjacent the end of said pipe. The flywheel is activated and rotates, thereby rotating the cutting tool (50).

3 Claims, 3 Drawing Sheets

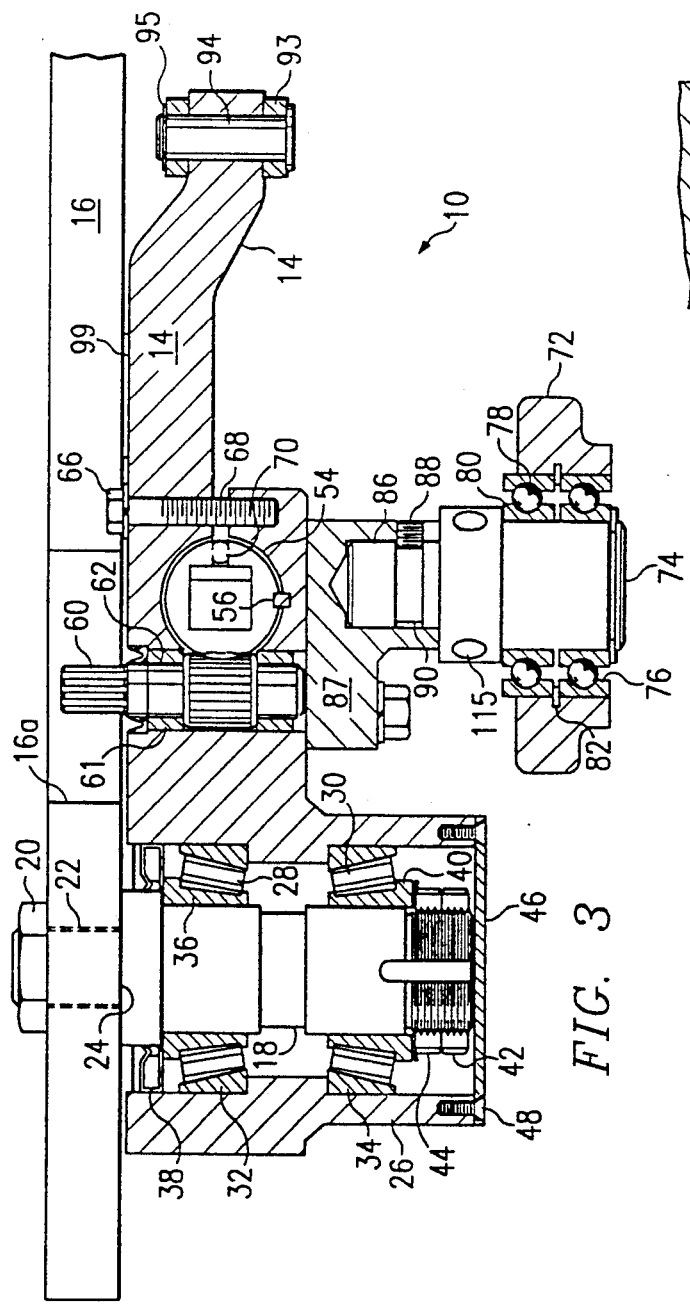
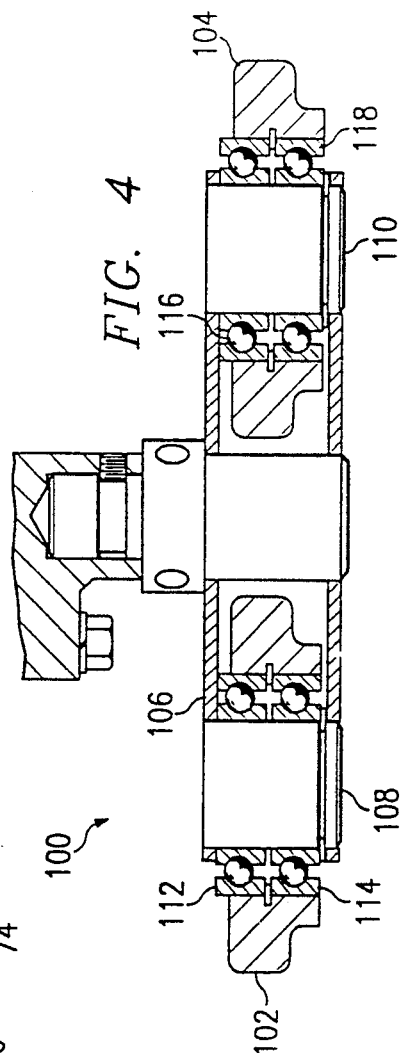

APPARATUS AND METHOD FOR COUNTERBORING A PIPE

FIELD OF THE INVENTION

This invention generally relates to an apparatus and method for counterboring a pipe. More specifically it relates to a mechanism for positioning and rotating a cutting tool against the inside surface of a pipe.

BACKGROUND OF THE INVENTION

In welding two pipes together, it is often advantageous to counterbore one pipe end. Precision and accuracy are desired when machining pipe ends, particularly when automatic or semi-automatic welding is utilized to join the pipe ends. The machining device must be held firmly in relation to the pipe in order to achieve these results. Further, in many instances a pipe in the field is out of round due to rough handling or manufacturing defects. Also, weld seams along the length of the pipe may provide an irregular surface. It is desirable that the machining tool follow the inner surface of the pipe with high precision to ensure uniform machining.

Various devices are known in the art for performing end surfacing, particularly counterboring on pipes and other elements. Such an end surfacing machine is described in U.S. Pat. No. 3,733,939 to Paysinger, et. al. which discloses an apparatus for preparation of large pipe ends for welding girth joints. The device is comprised of a case shaped, double ended aligning clamp which axially aligns and firmly supports a rotatable face plate. This plate carries multiple cutting tools and guide rollers, mounted on spring-biased pivoted arms which permit radially inward and outward motion of the tools and rollers with respect to the pipe end. The face plate is power driven around the axis of the clamp. Each pivoted arm carries a cutter closely coupled with a precision guide roller.

A firm backing surface to guide the machining tool during operation is desired. Means such as this are known in the art. However, such means are complicated requiring many parts and much set up time. Therefore, there is a need for a counterbore attachment that is simple in construction and easy to operate.

SUMMARY OF THE INVENTION

The present invention is a counterbore machine which may be utilized with an end surfacing machine for pipe. The counterbore machine is typically comprised of a frame pivotally attached to a flywheel. The flywheel is rotatably and slidably mounted on a shaft. The shaft connects an expander unit which is inserted into the pipe to be counterbored and a primary casing or housing structure containing a drive mechanism.

At least one guide wheel and a cutting tool are attached to the frame. A hydraulic actuator attached between the flywheel and the frame pivots the frame around a pivot pin and locates the guide wheel and the cutting tool against the inside of the pipe. The hydraulic actuator is supplied with hydraulic pressure by an accumulator. The guide wheel maintains contact with the inner surface of the pipe during operation. The cutting tool extends slightly higher than the guide wheel, the difference in height being equal to the desired counterboring depth. The cutting tool may be vertically positioned relative to the frame through rotation of a pinion which engages a cutting tool post in which the cutting tool is located. Vertical adjustment of the cutting tool allows the counterbore machine to be utilized with pipes having different wall thicknesses and for various cutting applications. A steel brush can be located proximate to the guide wheel for removing any debris from the guide wheel path. A devibration pad can also be located between the frame and flywheel to reduce any chatter that may occur during operation.

During operation the counterbore machine is placed in longitudinal alignment with a pipe. The expander unit is placed into the pipe. Roller brackets around the expander unit engage the inside surface of the pipe. The counterbore machine is inserted further into the pipe unit so that the cutting tool is adjacent the inner pipe surface at the end of the pipe. In one embodiment, a single guide wheel forward of the cutting tool follows any irregularities in the pipe and alters the position of the cutting tool in response thereto. In another embodiment, a pair of laterally adjacent guide wheels are used. This latter embodiment is particularly useful when a spiral weld is present on the inner surface of the pipe. After the counterbore machine is inserted, the flywheel is activated. As the flywheel rotates, the cutting tool abrades the inner surface of the pipe, shaving away metal. As the thickness of the pipe decreases, the cutting tool maintains contact with the inner surface due to the constant pressure asserted by the hydraulic actuator.

BRIEF DESCRIPTION OF THE DRAWINGS

A better and more complete understanding of the present invention and advantages thereof will be gained from the following detailed description, claims and accompanying drawings in which:

FIG. 3 is a sectional view taken along line 3—3; and

FIG. 4 is a partial sectional view of a second embodiment of the present invention in which a pair of laterally adjacent guide wheels are used.

DETAILED DESCRIPTION

Figure 1:
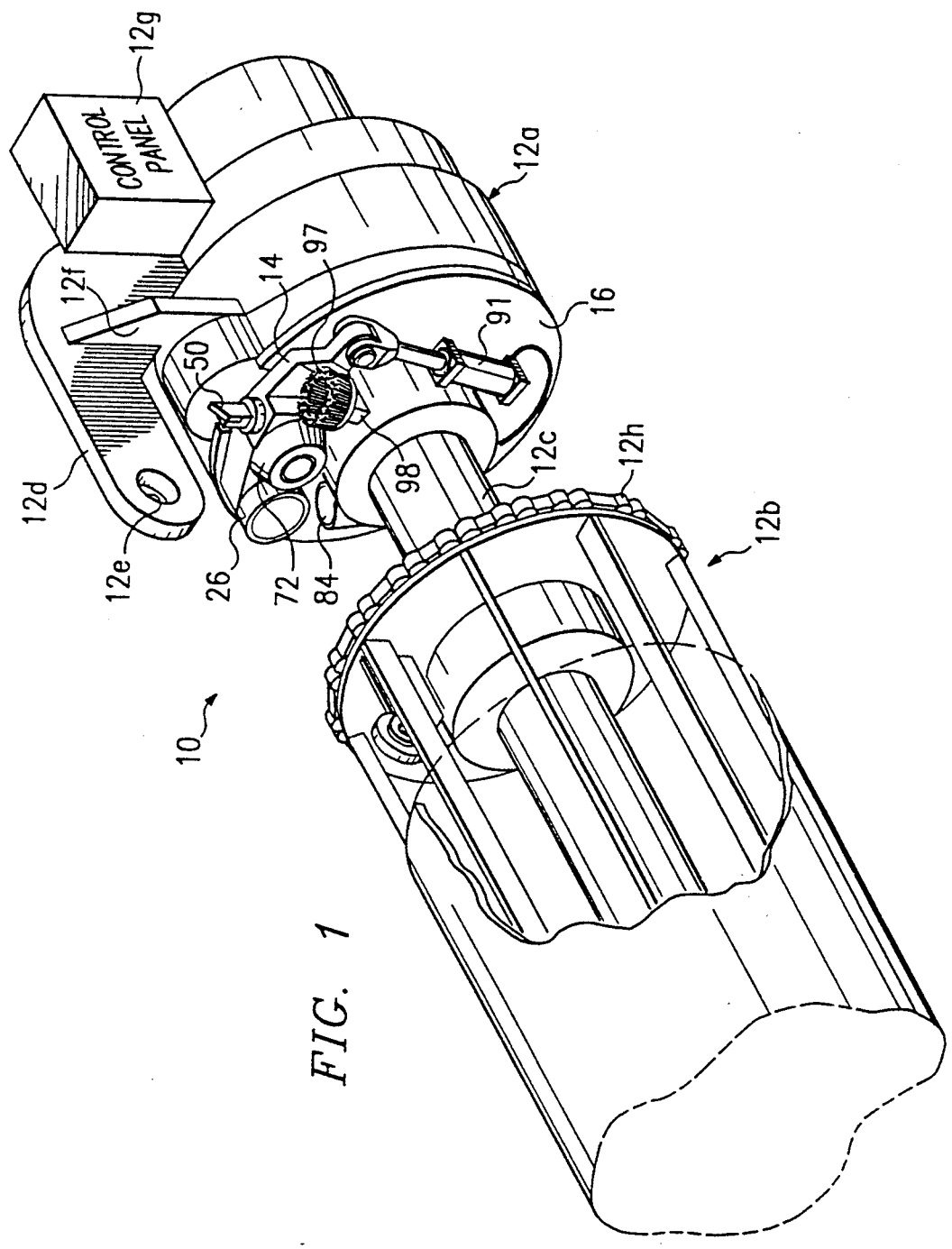
FIG. 1 is a perspective view of the present invention and installed on an end surface machine.

The present invention is a counterbore attachment for end surfacing machines that overcomes many of the disadvantages of the prior art. Referring to FIG. 1, counterbore attachment 10 is shown as utilized with end surfacing machine 12. The end surfacing machine 12 is comprised of a primary housing 12a, an expander unit 12b and a centrally located shaft 12c attached therebetween. The counterbore machine 10 is comprised of a frame 14 pivotally attached to a flywheel 16 through pivot pin 18 (not shown) located in pivot pin housing 26. The frame 14 is pivoted by hydraulic actuator 91 which is also mounted to the flywheel 16. The frame may be pivoted between a lower position and a raised position. The hydraulic actuator 91 is supplied with pressure by accumulator 84. A guide wheel 72 is mounted to frame 14 forward of cutting tool 50. A steel brush 97 is located proximate to guide wheel 72 for cleaning any debris from the path of guide wheel 72 during operation. Steel brush 97 is attached to arm 98 extending from frame 14.

Flywheel 16 rotates about shaft 12c by drive means, typically hydraulic, located in primary housing 12a. During operation, the flywheel 16 may be advanced along the shaft 12c thereby increasing the width of the counterbore. Primary housing 12a is typically a substantially cylindrical member with a lifting bracket 12d, an abutment member 12f, and control panel 12g mounted therebetween. The lifting bracket 12d has an eye hole 12e. The expander unit 12b is also typically a substantially cylindrical member with roller brackets 12h mounted therearound. Each roller bracket is mounted on a hydraulically activated shaft. Thus, when the expander unit 12b is inserted into the pipe to be counterbored, the roller brackets 12h may be extended to engage the inner surface of said pipe.

Figure 2:
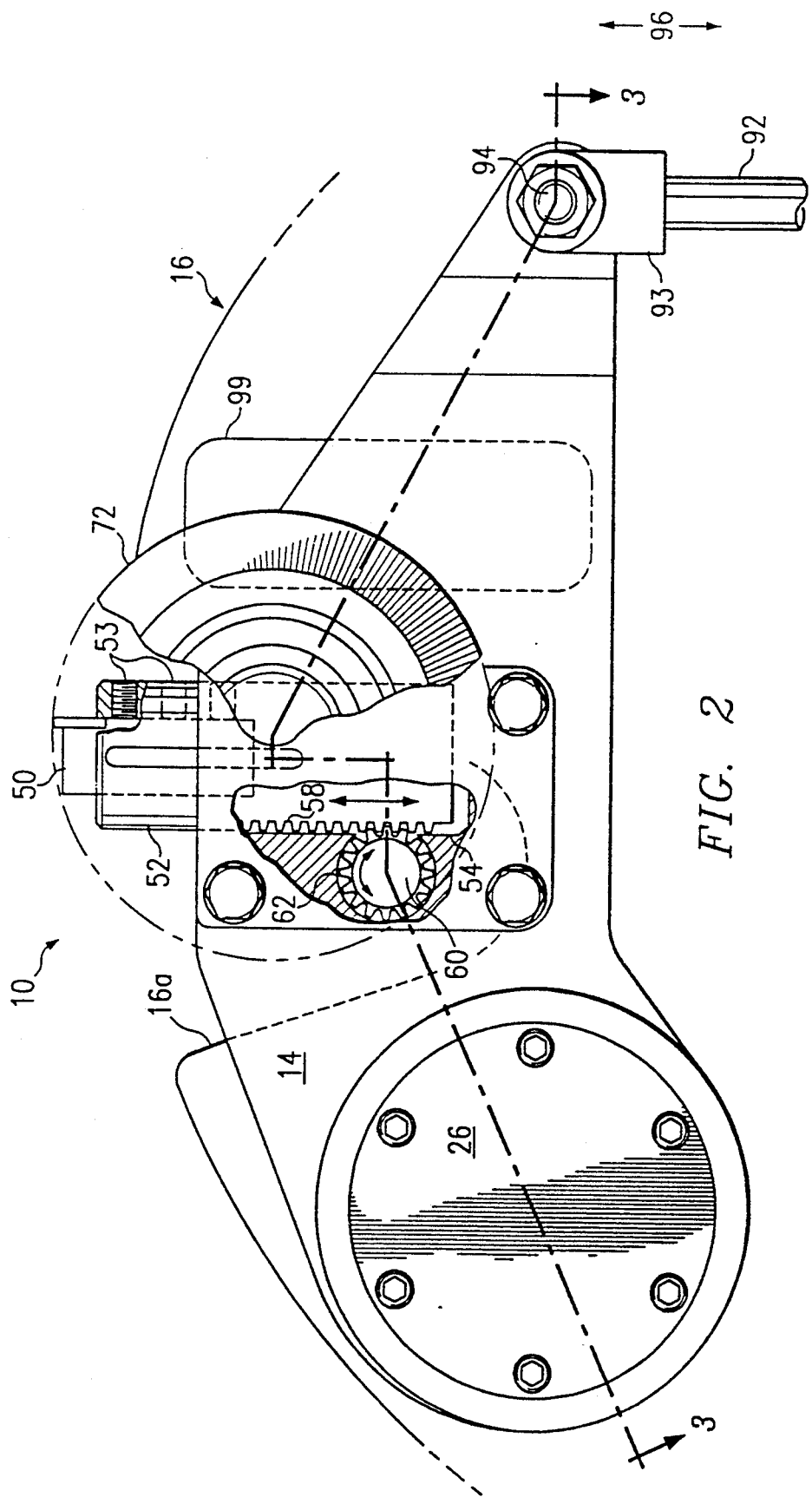
FIG. 2 is a partial sectional view of the present invention.

Referring to FIGS. 2 and 3, frontal and cross-sectional views of the counterbore machine 10 are shown. Guide wheel 72 is located forward of cutting tool 50. Cutting tool 50 is forward of flywheel 16. Cutting tool 50 is typically made of a carbide steel. The cutting tool 50 is mounted on tool post 52 and held therein by allen screws 53. Tool post 52 is located in bore 54. Tool post 52 has gears 58 that interact with pinion 60, thereby allowing pinion 60 to be rotated to vertically adjust cutting tool 50. The position of cutting tool 50 relative to frame 14 is maintained by tool post key 56. Pinion 60 is located in bore 62. Pinion 60 extends through envelope 61 in frame 14. The head of pinion 60 is accessibly located within groove 16a and flywheel 16 and may be rotated until the desired vertical position of cutting tool 50 is achieved. Clamping bolt 66 threadedly engages bore 68 allowing a clamping force to be exerted. This clamping force, when exerted reduces relief slat 70 thus fixing tool post 52 in place in bore 54. Thus, clamping bolt 66 is used to maintain the vertical adjustment of tool post 52 and therefore cutting tool 50. Clamping bolt 66 is loosened thereby releasing the clamping force on tool post 52. Bolts 66 are then tightened into bores 68 until frame 14 clamps against tool post 52 thereby securing tool post 52 to frame 14.

Pivot pin 18 is located in housing 26 and is captured interconnected to frame 14 by two roller thrust bearings 28 and 30. Bearings 28 and 30 are seated against housing 26 at shoulders 32 and 34, respectively. Bearing 28 is seated against bearing seat 36 adjacent pivot pin 18. Located proximate to bearing 28 is seal 38. Bearing 30 is seated against bearing seat 40 and held in place by nuts 42 and 44 threadedly engaging pivot pin 18. Pivot pin 18 is attached to frame 14 by nut 20 threadedly engaging threaded shank 22 of pivot pin 18. Nut 20 is typically welded to threaded shank 22. Threaded shank 22 extends through bore 24 of flywheel 16. Access to pivot pin 18 and bearings 28 and 30 is possible through cap 46 secured to housing 26 by screws 48.

Located forward of cutting tool 50 is guide wheel 72. Guide wheel 72 is attached to shank 74 through roller bearings 76 and 78. Roller bearings 76 and 78 are held in place by bearing seat 80 of shank 74 and snap rings 82 and 84. Shank 74 is located in bore 86 of frame extension 87 and held in place by allen screw 88 tightened against relief 90 of shank 74. Concentric pins 115 hold roller bearings 78 in place. The concentric pins 115 give additional adjustment when extensive wall thickness changes are encountered. A concentric pin is made by starting with a large shaft, typically 1 ¼ inches in diameter, and machining a smaller shaft typically 1 inch in diameter, on the outer edge of the larger shaft.

Frame 14 is positioned by hydraulic actuator 91. Hydraulic actuator 91 is attached to frame 14 through piston 92, clevis 93, pin 94 and snap ring 95. The base of the hydraulic actuator 91 is attached to flywheel 16. An accumulator 84 is attached to the hydraulic actuator 91 to provide hydraulic pressure Typically, a bladder-type accumulator pre-loaded with 300 psi of nitrogen is used. Travel of hydraulic actuator 91 is shown by arrow 96. Hydraulic actuator 91 pivots frame 14 about pivot pin 18. A devibration pad 99 can be located between frame 14 and flywheel 16 to reduce any vibrations or chatter therebetween. Devibration pad 99 may be made of teflon or other material exhibiting vibration dampening characteristics.

In operation, expander unit 12b of end surfacing machine 12 is inserted into the pipe to be machined. The frame and the cutting tool 50 are pivoted to a lower position during insertion. Roller brackets 12h are extended to contact the inner surface of said pipe. Once inserted, hydraulic actuator 91 is activated bringing both the cutting tool 50 and the guide wheel 72 against the inner surface of the pipe. Steel brush 97 is located proximate to guide wheel 72 for cleaning any debris from the path of guide wheel 72 during operation. Steel brush 97 is attached to arm 98 extending from frame 14. Flywheel 16 is activated, rotating the entire counterbore attachment 10 within the pipe to be machined. Cutting tool 50 abrades the inner surface of said pipe during operation, thus increasing the inner diameter of said pipe by shaving away material.

Referring to FIG. 4, a partial sectional view is shown of the guide wheel used in a second embodiment of counterbore attachment 100. Spiral, welding may be utilized in forming pipe. This manufacturing process produces a spiraling weld on the inner surface of the pipe end to end. The weld tends to offset counterbore attachment 10 and therefore the cutting tool. In order to minimize this problem, a pair of guide wheels 102 and 104 is utilized. The guide wheels 102 and 104 are captured in bearing housing 106 and are journaled on bearing shanks 108 and 110 by roller bearings 112, 114, 116 and 118. Guide wheels 102 and 104 are positioned in-line and off-axis from each other. While one guide wheel is disrupted by the weld, the other guide wheel maintains its position against the inner pipe. The offset associated with a single guide wheel is reduced by approximately one-half when utilizing a two guide wheel configuration.

Although two embodiments of the present invention have been illustrated in the accompanying drawings and described in the foregoing detailed description, it will be understood that the invention is not limited to the embodiments disclosed but is capable of numerous rearrangements, modifications and substitutions without departing from the scope of the invention.

What is claimed is:

1. An apparatus for counterboring a pipe, for use on a pipe end surfacing machine having a flywheel comprising:
   (a) a frame pivotally attached to the flywheel through a pivot pin and two roller thrust bearings;
   (b) a cutting tool interconnected to a tool post, said tool post having gear teeth and located in a bore in the frame;
   (c) a guide wheel extending forward of the cutting tool and interconnected to the frame through a shaft and roller bearing;
   (d) means for maintaining the rotational position of the tool post relative to the frame;
   (e) a relief slot located in said frame opening into the bore in which the tool post is located in;
   (f) at least one locking bolt extending through the relief slot threadedly engaging the frame providing a clamping force for securing the vertical position of the tool post;

(g) a pinion intermeshed with the gear teeth of the tool post for vertical adjustment of tool post relative to the frame when the locking bolts are loosened;

(h) a teflon devibration pad located between the flywheel and frame; and (i) a hydraulic actuator located opposite the pivot pin interconnected to the frame for locating the guide wheel against the pipe once the end surfacing machine has been positioned, the guide wheel maintaining the position of the cutting tool relative to the pipe during machining.

2. A method of counterboring a pipe with a counterbore apparatus having an expander unit connected to a primary housing by a longitudinally located shaft, a flywheel rotatably and slidably mounted on said shaft, a frame pivotally attached to said flywheel with a guide wheel and cutting tool mounted thereon, and an actuator for pivoting said frame from a flowered position to a raised position, which comprises:

(a) inserting the expander unit into the pipe;

(b) extending a plurality of roller brackets circumferentially mounted to the expander unit into contact with the inner surface of the pipe;

(c) advancing the counterbore apparatus further into the pipe with the frame in the lowered position until the cutting tool is adjacent the end of the pipe;

(d) positioning the guide wheel in contact with the inner surface of the pipe and the cutting tool against the end of the pipe;

(e) rotating the flywheel; and (f) advancing the flywheel along the shaft a predetermined distance so that the cutting tool counterbores the pipe.

3. The method of claim 2 wherein said positioning the guide wheel and the cutting tool comprises pivoting the frame to the raised position by activating the actuator.

* * * * *

UNITED STATES PATENT AND TRADEMARK OFFICE
CERTIFICATE OF CORRECTION

PATENT NO. : 5,171,110

DATED : December 15, 1992

INVENTOR(S) : Pettifer, et al.

It is certified that error appears in the above-identified patent and that said Letters Patent is hereby corrected as shown below:

Col. 4, line 27, please delete "Spiral," and substitute therefore -- Spiral --.

Col. 6, line 1, please delete "flowered" and substitute therefore -- lowered --.

Signed and Sealed this

Twenty-third Day of November, 1993

*Attest:*

BRUCE LEHMAN

*Attesting Officer*     *Commissioner of Patents and Trademarks*